US012703155B2

(12) United States Patent
Engler et al.

(10) Patent No.: US 12,703,155 B2
(45) Date of Patent: Aug. 11, 2026

(54) METHOD OF SETTING UP A JOINING DEVICE, METHOD OF JOINING A COVER LENS TO A HOUSING OF A MOTOR VEHICLE LIGHTING DEVICE AND SYSTEM

(71) Applicants: HELLA GmbH & Co. KGaA, Lippstadt (DE); HELLA Saturnus Slovenija d.o.o., Ljubljana (SI); HELLA Autotechnik Nova s.r.o., Mohelnice (CZ)

(72) Inventors: Ingo Engler, Soest (DE); Miguel Lebrato-Rastrojo, Paderborn (DE); Thomas Herbers, Lippstadt (DE); Andreas Schmitz, Erwitte (DE); Primoz Petac, Kamnik (SI); Tadej Vovk, Ljubljana (SI); Jure Habjan, Domzale (SI); Klemen Skapin, Vodice (SI); Tomas Kubat, Koprivnice (CZ); Jane Frantisek, Mohelnice (CZ); David Nejezchleba, Úsov (CZ); Rainer Brys, Lippstadt (DE); Alfredo Verdin Moreno, San Mateo Tecoloapan (MX); Thomas Albert Roebbecke, Erwitte (DE); Ludger-Josef Gruene, Hoexter (DE)

(73) Assignees: Hella GmbH & Co. KGaA, Lippstadt (DE); Hella Saturnus Solvenija D.O.O, Ljubijana (SI); Hella Autotechnik Nova S.R.O., Mohelnice (CZ)

( * ) Notice: Subject to any disclaimer, the term of this patent is extended or adjusted under 35 U.S.C. 154(b) by 82 days.

(21) Appl. No.: 18/628,185

(22) Filed: Apr. 5, 2024

(65) Prior Publication Data

US 2024/0308152 A1 Sep. 19, 2024

Related U.S. Application Data

(63) Continuation of application No. PCT/EP2021/077398, filed on Oct. 5, 2021.

(51) Int. Cl.
*B29C 65/00* (2006.01)
*B29C 65/48* (2006.01)
(Continued)

(52) U.S. Cl.
CPC .............. *B29C 66/95* (2013.01); *B29C 65/48* (2013.01); *B29C 65/562* (2013.01);
(Continued)

(58) Field of Classification Search
CPC ....... B29C 66/95; B29C 65/48; B29C 65/562; B29C 65/7817; B29C 65/7847;
(Continued)

(56) References Cited

U.S. PATENT DOCUMENTS 7,222,431 B1 * 5/2007 Norton .................. B25J 9/1692 33/286
11,724,462 B2 8/2023 Hagen et al.
(Continued)

FOREIGN PATENT DOCUMENTS

DE 1622031 A1 10/1970
DE 102010024169 A1 12/2011
(Continued)

OTHER PUBLICATIONS

International Search Report dated Jun. 28, 2022 in corresponding application PCT/EP2021/077398.

*Primary Examiner* — Christopher W Raimund
(74) *Attorney, Agent, or Firm* — Muncy, Geissler, Olds & Lowe, P.C.

(57) ABSTRACT

A method of setting up a joining device for joining a cover lens to a housing of a vehicle lighting device. The joining
(Continued)

device features a mounting fixture and a robot with a suction head, The method features at least the following steps: inserting a housing into the mounting fixture and a cover lens into the suction head; transferring the suction head to an initial joining pose; joining the cover lens to the housing with the suction head in the initial joining pose; measuring the pose of the cover lens relative to a reference-point system, which comprises reference points on the surface of the housing and/or the cover lens; determining a set of translations and/or rotations, which transfer the cover lens to an optimal pose with minimal deviations from a target pose; and correcting the initial joining pose of the suction head with the determined set of translations and/or rotations.

10 Claims, 6 Drawing Sheets

(51) Int. Cl.

| | |
|---|---|
| ***B29C 65/56*** | (2006.01) |
| ***B29C 65/78*** | (2006.01) |
| ***B29L 11/00*** | (2006.01) |
| ***B29L 31/30*** | (2006.01) |
| ***F21S 41/29*** | (2018.01) |
| ***F21S 43/27*** | (2018.01) |

(52) U.S. Cl.
CPC ...... *B29C 65/7817* (2013.01); *B29C 65/7847* (2013.01); *B29L 2011/0016* (2013.01); *B29L 2031/3055* (2013.01); *F21S 41/29* (2018.01); *F21S 43/27* (2018.01)

(58) Field of Classification Search
CPC ..... B29C 66/8163; B29C 65/02; B29C 65/06; B29C 65/20; B29C 65/7802; B29C 66/301; B29C 66/542; B29C 66/73365; B29C 66/7392; B29C 66/8185; B29C 66/863; B29L 2011/0016; B29L 2031/3055; B29L 2031/30; B29L 2031/747; F21S 41/29; F21S 43/27
See application file for complete search history.

(56) References Cited

U.S. PATENT DOCUMENTS

| | | | | |
|---|---|---|---|---|
| 2015/0171048 | A1* | 6/2015 | Yasuyoshi | B29C 65/1664 156/379.6 |
| 2019/0193337 | A1* | 6/2019 | Schuette | B29C 65/02 |

FOREIGN PATENT DOCUMENTS

| | | | | |
|---|---|---|---|---|
| DE | 102019106349 | A1 * | 9/2020 | B62D 65/16 |
| DE | 102019127867 | A1 | 4/2021 | |
| JP | 2012138423 | A * | 7/2012 | |

* cited by examiner 1000
100
200
300
400
500
600
2000
3000
4000
5000

METHOD OF SETTING UP A JOINING DEVICE, METHOD OF JOINING A COVER LENS TO A HOUSING OF A MOTOR VEHICLE LIGHTING DEVICE AND SYSTEM

This nonprovisional application is a continuation of International Application No. PCT/EP2021/077398, which was filed on Oct. 5, 2021, and which is herein incorporated by reference.

BACKGROUND OF THE INVENTION

Field of the Invention

The present invention relates to a method of setting up a joining device for joining a cover lens to a housing of a motor vehicle lighting device. The invention furthermore relates to an associated method of joining a cover lens to a housing of a motor vehicle lighting device by a joining device, and to a corresponding system.

Description of the Background Art

The installation of a motor vehicle lighting devices in a vehicle body requires that the course of the gap and the contour between the cover lens of the installed lighting device and the vehicle body corresponds to a predetermined course within narrow tolerance limits. The connection to the vehicle body is usually established via the housing of the lighting device, so that a reference-point system for the manufacture of the lighting device is assigned to the housing, wherein the joining pose of the cover lens relative to the housing plays a central role. The present invention addresses the reproducible, dimensionally accurate joining of cover lenses to housings for the series production of motor vehicle lighting devices.

A cause of deviations from the nominal dimensions of the lighting device is dimensional scattering from the individual part production of the cover lens and the housing, which is reflected in the final assembled unit. With regard to this problem, DE 102010024 169 A1 discloses to provide tolerance compensation areas moulded to the joining sections of the cover lens and the housing and to remove the required amount of these compensation areas before joining the lens and the housing in order to join a dimensionally accurate unit.

Another cause for insufficient dimensional accuracy of the lighting device can be an imprecise set-up of the joining device. For example, the cover lens and the housing are joined together as plastic components by means of a welding process, such as friction welding or hot plate welding, or by means of an adhesive bonding process. For this purpose, the cover lens is received in a holding device and the housing is received in a mounting fixture, wherein the holding device and mounting fixture can be moved in translation and/or rotation relative to one another by means of suitable adjustment means. The set-up process of the joining device concerns in particular the determination of a suitable relative positioning of the holding device to the mounting fixture during joining, i.e., such a positioning that corresponds to a desired target pose of the received cover lens on the housing.

In prior art joining processes, the setting-up is usually performed as follows. A first sample of a unit having a cover lens and a housing is joined in an initial positioning of the joining device and then the resulting pose of the cover lens on the housing, which represents the reference-point system on the vehicle body, is measured. Based on this measurement protocol, the positioning of the joining device is then readjusted, i.e., the relative arrangement of the holding device to the mounting fixture is adjusted to correct the measured deviations. In the prior art, this readjustment is usually carried out “manually” on the basis of the practical experience of the responsible operating personnel and, due to the large number of degrees of freedom in the relative positioning of the holding device and the mounting fixture, a large number of test units is usually necessary until the joining device is approximately set up in a target position in which dimensionally accurate units can be joined.

DE 10 2019 127 867 A1, which corresponds to US 2022/0234304, which is incorporated herein by reference, relates to a method for setting up a special joining device with a displaceable and rotatable housing mounting fixture, wherein the set-up process is carried out automatically by means of simulated representations of the joining device in different positions.

SUMMARY OF THE INVENTION

It is therefore an object of the present invention to provide an alternative method of setting up a joining device for joining a cover lens to a housing of a motor vehicle lighting device, which overcomes the aforementioned disadvantages of the prior art and, in particular, enables an economical automatic procedure. Furthermore, the object of the present invention is to provide an associated method for joining a cover lens to a housing of a motor vehicle lighting device.

In an example, a method is provided for setting up a joining device for joining a cover lens to a housing of a motor vehicle lighting device, wherein the joining device features a mounting fixture and a robot with a suction head, and wherein the method features at least the following steps: inserting a housing into the mounting fixture and a cover lens into the suction head, transferring the suction head to an initial joining pose, joining the cover lens to the housing with the suction head in the initial joining pose, measuring the pose of the cover lens relative to a reference-point system, which comprises reference points on the surface of the housing and/or the cover lens, determining a set of translations and/or rotations, which transfer the cover lens to an optimal pose with minimal deviations from a target pose, and correcting the initial joining pose of the suction head with the determined set of translations and/or rotations.

The invention is based on the idea of replacing the trial-and-error approach used in the prior art for determining the optimal pose of the cover lens or the suction head when joining the cover lens to the housing by means of a computer-aided best-fit analysis and automating the set-up process on this basis. For this purpose, a component joined in an initial joining pose of the suction head is measured, whereby the pose of the cover lens is quantified using a defined reference-point system. In the process, deviations from the desired pose of the cover lens are typically determined, which are based in particular on dimensional deviations of the components from the individual part production and on the inappropriate initial setup of the joining device. The method according to the invention aims at determining an optimum pose of the cover lens on the housing, which has minimal deviations from the desired pose, as well as a corresponding optimum pose of the suction head during joining. For optimization, a regression analysis of the measurement data is carried out automatically, in which the regression parameters to be determined correspond to the set of translations and/or rotations sought, which transfer the suction head and thus the cover lens received therein into the respective optimal (joining) pose, whereby in the optimal pose the totality of the dimensional deviations of the cover lens from its target pose in the reference-point system is minimal. With the set of translations and/or rotations determined in this way, the initial joining pose of the suction head is corrected, after which the set-up process is completed and the joining device is prepared for the dimensionally accurate joining of a series of lighting devices to be produced.

The pose of the cover lens on the housing can be measured, for example, by scanning the surface of the cover in a coordinate-measuring machine or by means of an optical measuring method, for example by means of a laser scanner. The set-up method according to the invention can be used for different joining devices, in particular for joining devices, in which the cover lens is joined to the housing by means of adhesive bonding, or for welding devices, for example based on friction welding or hot plate welding. In general, the set-up method may apply to any device for physical or mechanical joining. The robot is designed, for example, as an articulated robot or as a hexapod.

The reference-point system can comprise six reference points each on the surface of the housing and of the cover lens. In particular, the reference points on the housing may correspond to the customer's reference points for receiving the lighting device in a vehicle body. With reference to the reference points on the housing, the pose of the lens in the subsequent mounting position in the vehicle body can thus be quantified and with reference to the reference points on the lens itself, dimensional distortion from the individual part production can be detected.

In particular, a measuring-point system can be defined, which features measuring points on the surface of the cover lens, wherein the pose of the cover lens is defined by the positions of the measuring points relative to the reference-point system. Consequently, it is not necessary to measure the entire surface of the cover lens and compare it to the reference-point system, rather, it can be sufficient to define and measure selected measuring points in order to determine the pose of the cover lens. The measuring points can be subdivided into measuring points that are particularly meaningful for a gap dimension of the cover lens, i.e., for the gap between the lighting device and the vehicle body in the final mounting position, as well as for height dimensions of the cover lens, whereby the contour of the lighting device can be described. For example, the measuring-point system comprises about one hundred measuring points.

The set of translations and/or rotations for correcting the initial joining pose of the suction head can be determined by means of linear regression analysis, especially by means of least-squares fitting. The aim of this best-fit analysis is to find the set of translations and/or rotations that transfer the cover lens from its initial pose on the housing to the optimal pose in which the sum of squares of the deviations of all measuring points from their respective nominal positions is minimal. The translations and/or rotations sought thus represent the parameters to be determined by the best-fit evaluation.

The housing can feature three hollow screws, which each extend through protruding lugs and which are oriented mutually perpendicular or parallel, wherein each one reference point is defined on the bottom surface of the hollow screws. The bottom surface of the hollow screws is typically used as the contact section for the purpose of mounting the lighting device in a vehicle body and the selected reference points correspond to the mounting reference points (of the OEM customer). By varying the screw-in depth of the hollow screws, the position of the reference points can be influenced in a practical way, which offers a necessary corrective measure in the event that, for example, there are large dimensional deviations from the individual part production of the housing and/or cover lens. Instead of or in addition to the hollow screws, further adjustment means can be provided on the housing for adjusting the reference points.

Advantageously, the mounting fixture can receive the housing stress-free at reference points on the surface of the housing. In particular, the housing can be received on the bottom surface of the aforementioned hollow screws.

The mounting fixture and/or the suction head can be provided with position sensors, by means of which a proper insertion of the housing into the mounting fixture and/or of the cover lens into the suction head is controlled. A repeatable, dimensionally accurate pick-up of the components is the prerequisite for the further process.

The invention furthermore relates to a method of joining a cover lens to a housing of a motor vehicle lighting device by a joining device, wherein the joining device features a mounting fixture and a robot with a suction head, and wherein the method features at least the following steps: setting up the joining device by the method according to one of the aforementioned embodiments, inserting the housing into the mounting fixture and the cover lens into the suction head, transferring the suction head to the corrected joining pose, and joining the cover lens to the housing with the suction head in the corrected joining pose.

After successful set-up, the joining of the cover lens with the housing produces a dimensionally accurate lighting device, and ideally a large number of joining processes can be carried out until the joining device needs to be set up again. Thus, in the context of series production, the effort for checking the fabricated lighting devices and for corrective interventions in the positioning of the joining device is advantageously reduced.

The corrected joining pose of the suction head can be adjusted to the ambient temperature by taking into account the related thermal expansion of the cover lens, the housing and/or the suction head. For example, in a production hall that is operated around the clock and is not air-conditioned, there may be ambient temperature differences between a minimum temperature of 10° C. and a maximum temperature of over 30° C., and the thermal expansion of the said plastic components may be in the order of a millimetre. To correct for thermal expansion, the temperature dependent geometries of the cover lens, the housing and the suction head are measured independently of each other and tabulated for each ambient temperature in question, so that suitable table values can be accessed for the purpose of automatically adjusting the pose of the suction head.

Moreover, the invention relates to a system for joining a cover lens to a housing of a motor vehicle lighting device by the method according to one of the aforementioned embodiments, at least comprising: the joining device for joining the cover lens to the housing, wherein the joining device features the mounting fixture and the robot with the suction head, a measuring device for measuring the pose of the cover lens relative to the reference-point system, and a control unit for determining the set of translations and/or rotations, which transfer the cover lens to the optimal pose with minimal deviations from the target pose, correcting the initial joining pose of the suction head with the determined set of translations and/or rotations, and adjusting the corrected joining pose of the suction head to the ambient temperature by taking into account the related thermal expansion of the cover lens, the housing and/or the suction head.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
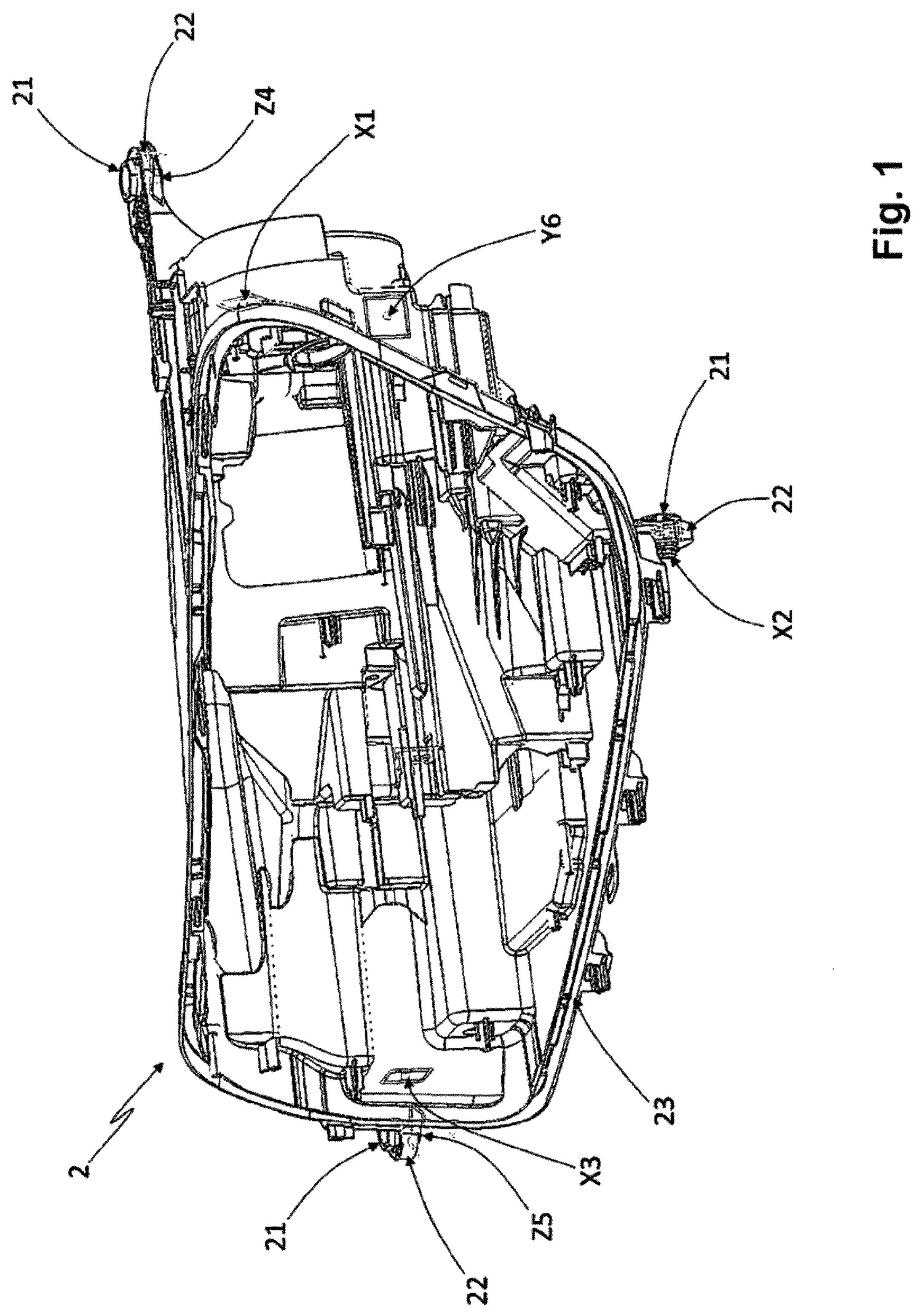
FIG. 1 shows a perspective view of a housing.

FIG. 1 shows an exemplary housing 2 as an injection-moulded component made of a thermoplastic material, which is provided for accommodating the lighting components of a motor vehicle lighting device and for joining with a cover lens in accordance with the joining method according to the invention The joint is provided as an adhesive bond, for which purpose the adhesive channel 23 runs around the front of the housing 2. During the joining process, the adhesive channel 23 is filled with an adhesive and a corresponding, circumferential joining section on the cover lens is immersed in the adhesive channel 23 in the joining pose of the cover lens.

The housing 2 features the three hollow screws 21 which extend through the peripherally protruding lugs 22 and are oriented parallel or perpendicular to each other. The bottom surfaces of the hollow screws 21 serve as a support in the later mounting position in a vehicle body. The reference points X2, Z4, Z5 as part of the reference-point system are defined on the bottom surfaces of the hollow screws 21, whereby the reference points X2, Z4, Z5 can in particular also be part of the OEM customer's reference-point system. Changing the screw-in depth of the hollow screws 21 yields an option to adapt the reference points X2, Z4, Z5 during the process of setting-up the joining device or during the subsequent joining process.

Figure 2:
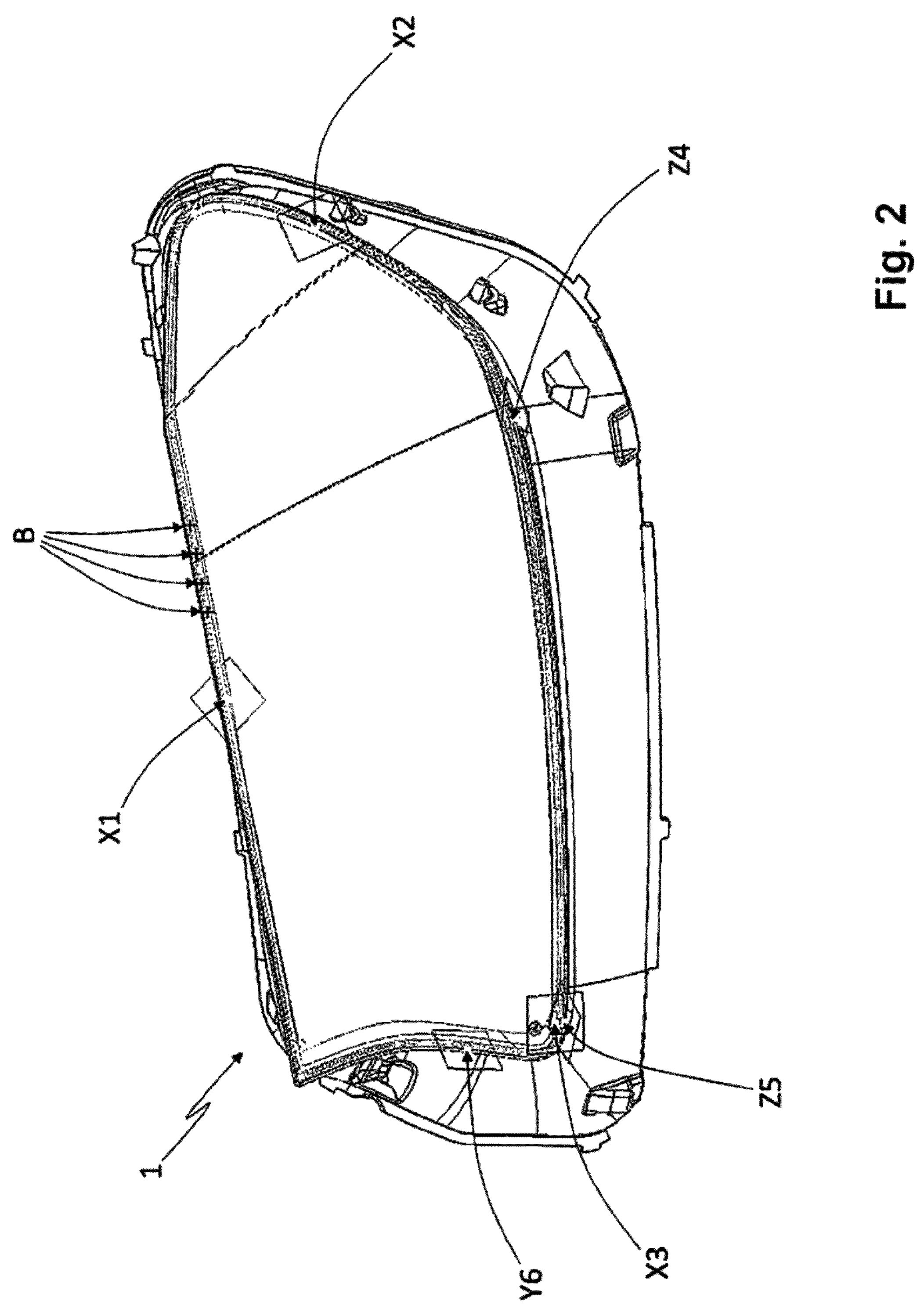
FIG. 2 shows a perspective view of a cover lens.

FIG. 2 shows an associated cover lens 1, which is an injection-moulded component made of a transparent plastic. The six reference points X1, X2, X3, Z4, Z5, Y6 on the surface of the lens 1 together with the reference points on the housing (see FIG. 1) form the reference-point system.

Furthermore, the measuring-point system comprising the various measuring points B is defined on the surface of the cover lens 1, the positions of which are measured in the joined unit relative to the reference point system to quantify the pose of the cover lens 1 on the housing. The measuring point system advantageously comprises a number of about one hundred measuring points, of which only a few examples are shown in FIG. 2 for the sake of clarity.

Figure 3:
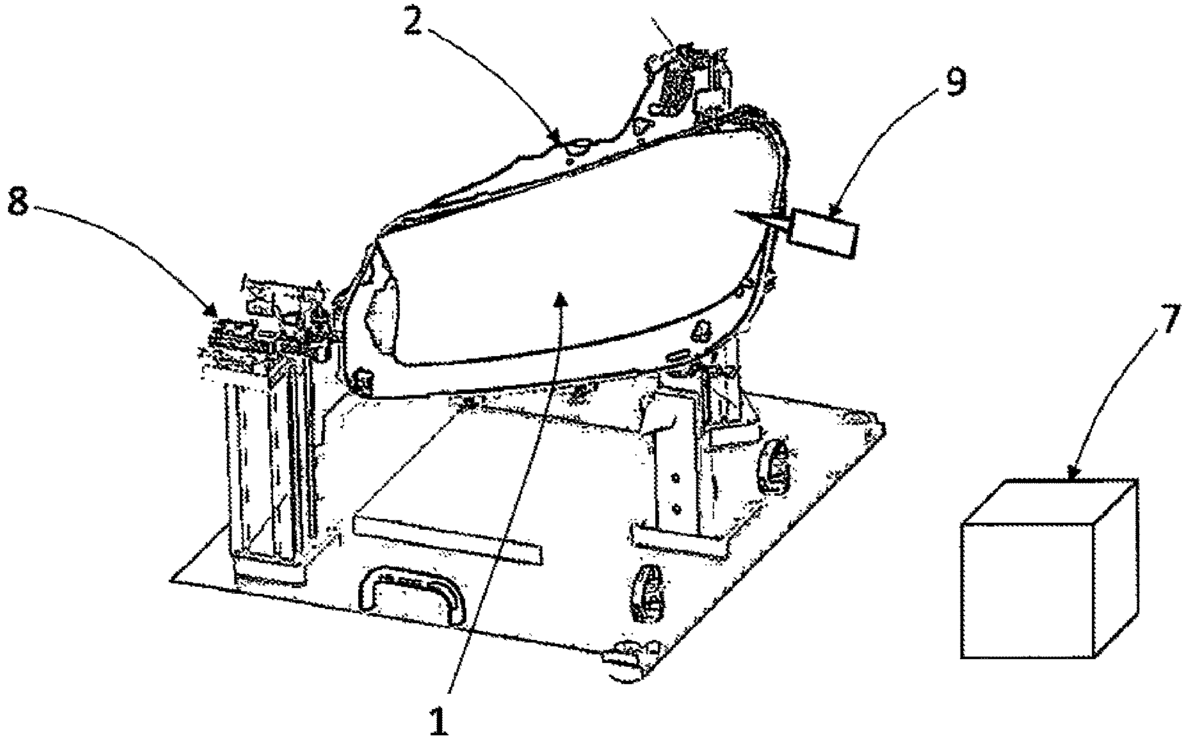
FIG. 3 shows a perspective view of a lighting device in a coordinate measuring machine.

FIG. 3 shows a lighting device with a cover lens 1 and a housing 2 on a coordinate-measuring machine comprising the holder 8 and the tactile measuring head 9. The housing 2 is held stress-free in the holder 8 via the bottom surfaces of the hollow screws 21 and the coordinate-measuring machine measures the pose of the cover lens 1 based on the positions of the measuring points relative to the reference point system.

The control unit 7 serves to process the measurement data collected with the coordinate-measuring machine during the set-up procedure according to the invention. The regression-analytical determination of the set of translations and/or rotations, which transfer the cover lens 1 into an optimal pose with minimal deviations from the target pose, is carried out automatically by the control unit 7. Furthermore, the control unit 7 automatically performs the correction of the initial joining pose of the suction head based on the previously determined set of translations and/or rotations. For this purpose, the control unit 7 performs, for example, a coordinate transformation that represents the set of translations and/or rotations in relation to a tool centre point as a virtual reference point for the pose of the articulated robot and the suction head.

Within the framework of the joining method according to the invention, the control unit 7 is further designed to adapt the corrected joining pose of the suction head to the ambient temperature by making an appropriate correction by means of the tabulated thermal expansion dimensions of the cover lens, housing and/or suction head, which correction ensures a dimensionally accurate joining of the cover lens to the housing.

Figure 4A:
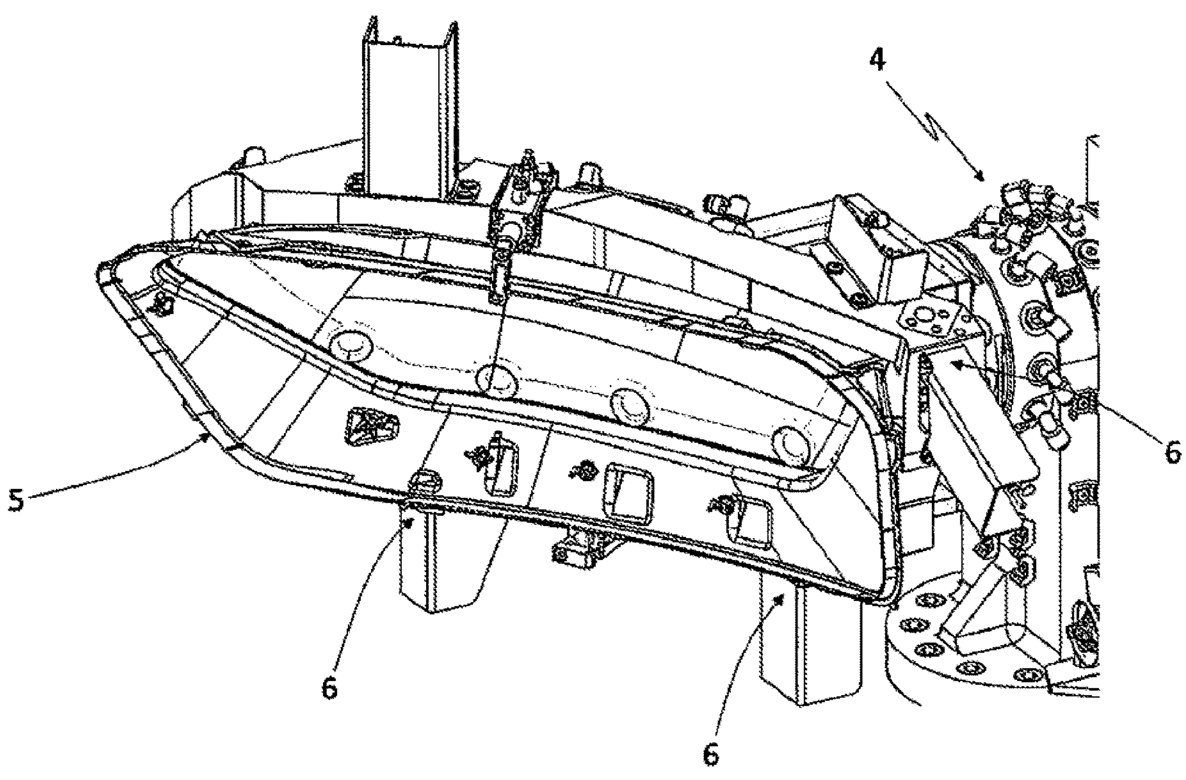
FIG. 4*a* shows a perspective view of an articulated robot with a suction head.
Figure 4B:
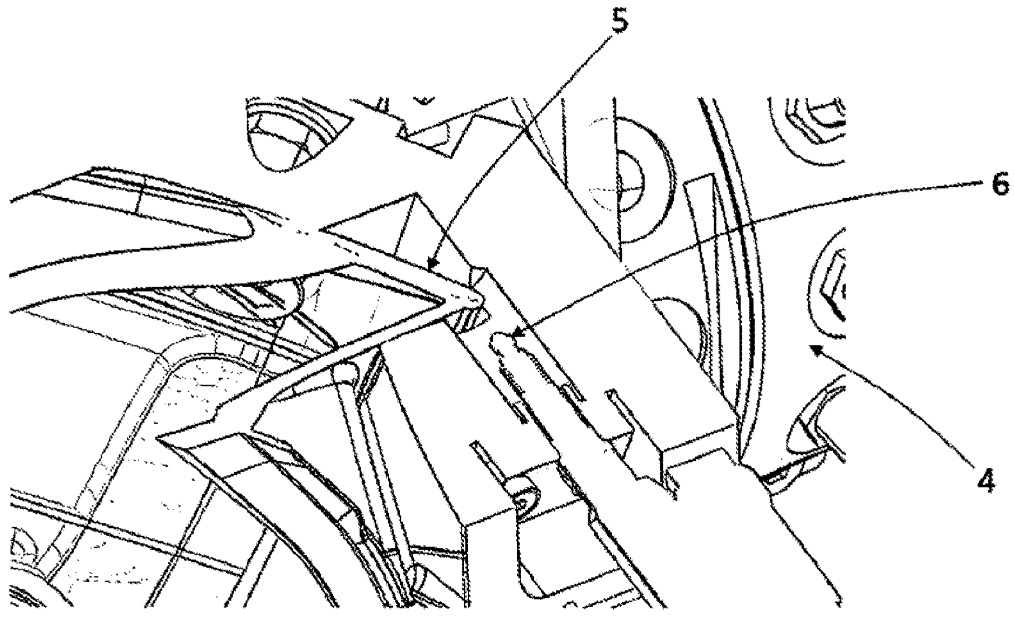
FIG. 4*b* shows a detail of FIG. 4*a* in partial cross-section view.

FIG. 4*a* shows the suction head 5 for pick-up of a cover lens, wherein the suction head 5 is held as an end effector on the articulated robot 4. FIG. 4*b* shows a partial cross-section view of a detail of FIG. 4*a*, in which a position sensor 6 is shown, which checks the correct seating of the suction head 5 at the articulated robot 4 and thus of the cover lens to be picked up thereon. In particular, several such position sensors 6 can be arranged distributed along the suction head 5.

Figure 5A:
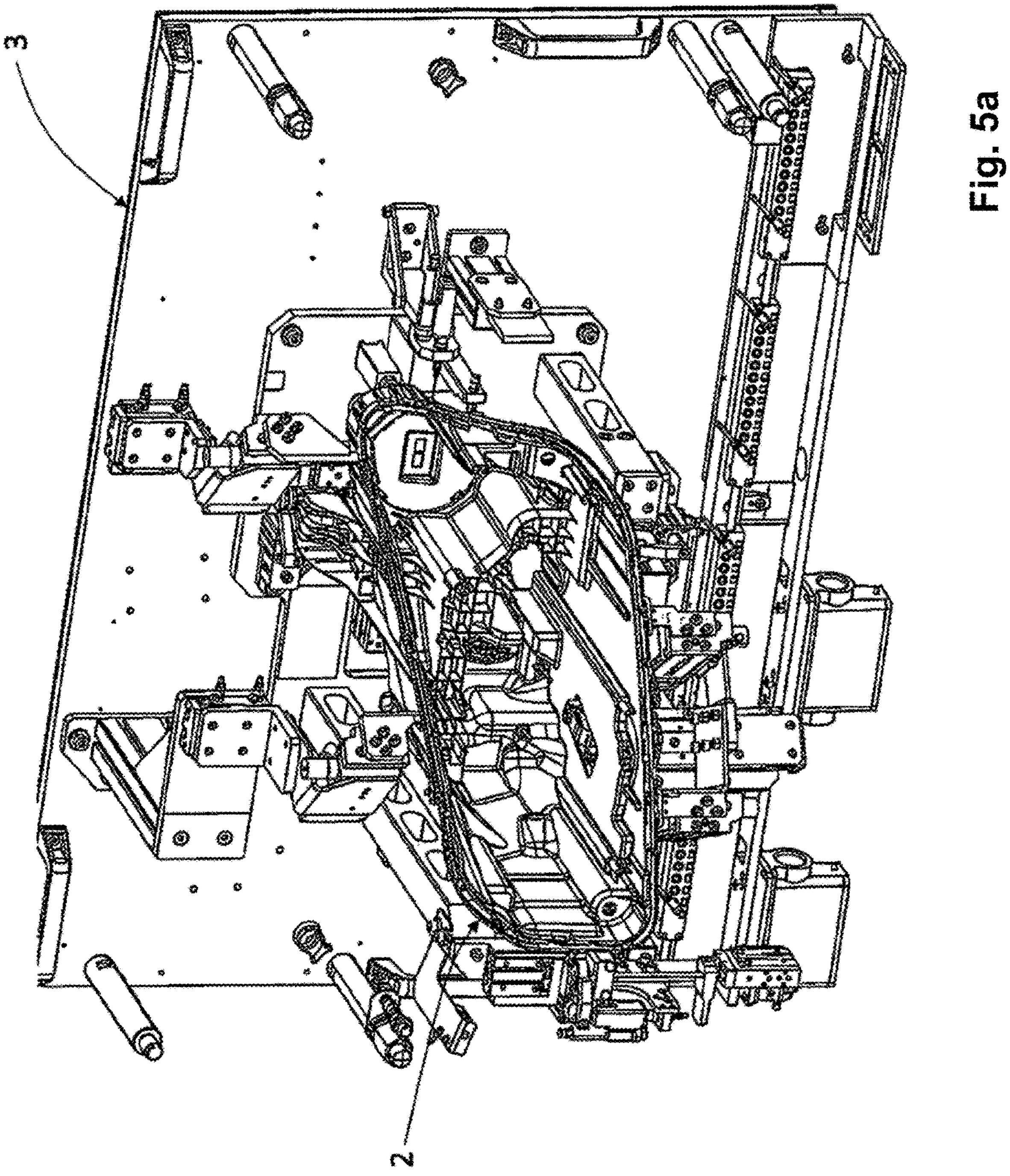
FIG. 5*a* shows a perspective view of a housing in a mounting fixture.
Figures 5B, 6:
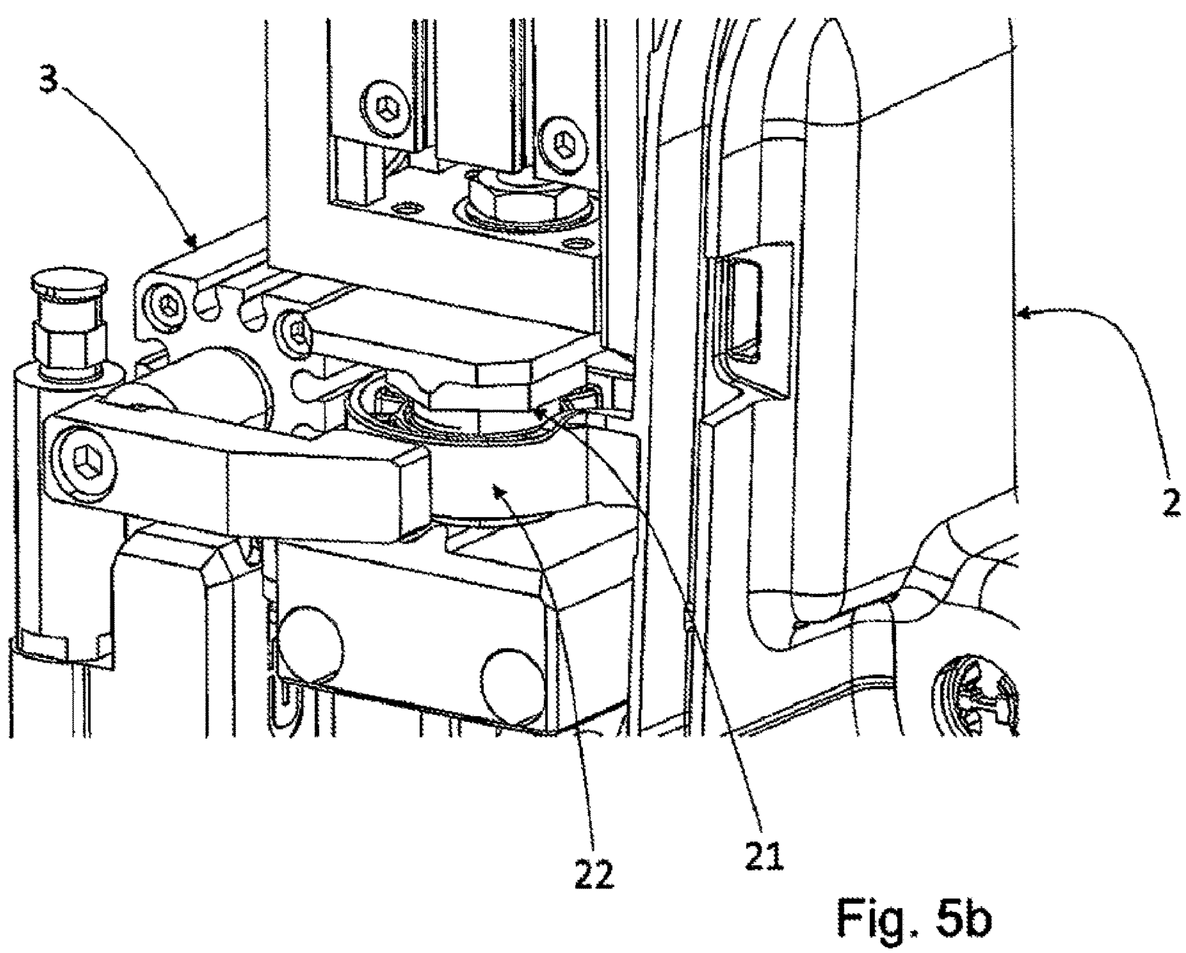
FIG. 5*b* shows a detail to FIG. 5*a*.
FIG. 6 shows a flow chart representation of the inventive methods.

FIG. 5*a* shows a housing 2 in a mounting fixture 3 as part of a joining device, and FIG. 5*b* shows an associated detail. The housing 2 is mounted stress-free on the bottom surfaces of the hollow screws 21, which corresponds to the mounting situation in the holder of the coordinate measuring machine. In interaction with the further holding means 31, a 6-value alignment of the housing 2 takes place.

The system for joining a cover lens to a housing of a motor vehicle lighting device according to the invention at least comprises a joining device with a mounting fixture and a robot with a suction head, measuring device, e.g., a coordinate-measuring machine, and a control unit like shown in the aforementioned figures.

FIG. 6 shows a flow chart illustrating the two methods according to the invention. The method 1000 of setting up a joining device represents the first step of the joining method according to the invention and comprises the following steps: inserting 100 a housing into the mounting fixture and a cover lens into the suction head, transferring 200 the suction head to an initial joining pose, joining 300 the cover lens to the housing with the suction head in the initial joining pose, measuring 400 the pose of the cover lens relative to a reference-point system, which comprises reference points on the surface of the housing and/or the cover lens, determining 500 a set of translations and/or rotations, which transfer the cover lens to an optimal pose with minimal deviations from a target pose, and correcting 600 the initial joining pose of the suction head with the determined set of translations and/or rotations.

After successful completion of the method 1000, the joining device is set up for the dimensionally accurate joining of cover lenses with housings and, in the joining method according to the invention, the following steps are then carried out and expediently repeated in the course of a series production: adjusting 2000 the corrected joining pose of the suction head to the ambient temperature by taking into account the related thermal expansion of the cover lens, the housing and/or the suction head, inserting 3000 the housing into the mounting fixture and the cover lens into the suction head, transferring 4000 the suction head to the corrected joining pose, and joining 5000 the cover lens to the housing with the suction head in the corrected joining pose.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of setting up a joining device for joining a cover lens to a housing of a motor vehicle lighting device, the joining device comprising a mounting fixture and a robot with a suction head, the method comprising:

inserting the housing into the mounting fixture and the cover lens into the suction head;

transferring the suction head to an initial joining pose;

joining the cover lens to the housing with the suction head in the initial joining pose;

measuring a pose of the cover lens on the housing relative to a reference-point system, which comprises reference points on a surface of the housing and/or the cover lens;

determining a set of translations and/or rotations, which transfer the pose of the cover lens to an optimal pose with minimal deviations from a target pose; and correcting the initial joining pose of the suction head to a corrected joining pose with the set of translations and/or rotations, wherein the housing includes hollow screws, which each extend through protruding lugs and which are oriented mutually perpendicular or parallel, wherein a bottom surface of each of the hollow screws defines a respective one of the reference points.

2. The method according to claim 1, wherein the reference-point system comprises six reference points, each on the surface of the housing and of the cover lens.

3. The method according to claim 1, wherein a measuring-point system is defined, which features measuring points on the surface of the cover lens, wherein the pose of the cover lens is defined by positions of the measuring points relative to the reference-point system.

4. The method according to claim 1, wherein the set of translations and/or rotations for correcting the initial joining pose of the suction head is determined via a linear regression analysis or via a least-squares fitting.

5. The method according to claim 1, wherein the housing includes three of the hollow screws.

6. The method according to claim 1, wherein the mounting fixture receives the housing stress-free at the reference points provided on the surface of the housing.

7. The method according to claim 1, wherein the mounting fixture and/or the suction head are provided with position sensors, via which a proper insertion of the housing into the mounting fixture and/or of the cover lens into the suction head is controlled.

8. A method of joining a cover lens to a housing of a motor vehicle lighting device by a joining device, wherein the joining device comprises a mounting fixture and a robot with a suction head, the method comprising:

setting up the joining device by the method according to claim 1;

transferring the suction head to the corrected joining pose; and joining the cover lens to the housing with the suction head in the corrected joining pose.

9. The method according to claim 8, wherein the corrected joining pose of the suction head is adjusted to an ambient temperature by taking into account a related thermal expansion of the cover lens, the housing and/or the suction head.

10. A system for joining a cover lens to a housing of a motor vehicle lighting device by the method according to claim 8, the system at least comprising:

the joining device for joining the cover lens to the housing, wherein the joining device comprises the mounting fixture and the robot with the suction head;

a measuring device for measuring the pose of the cover lens relative to the reference-point system; and a control unit for determining the set of translations and/or rotations, which transfer the pose of the cover lens to the optimal pose with minimal deviations from the target pose, for correcting the initial joining pose of the suction head to the corrected joining pose with the determined set of translations and/or rotations, and for adjusting the corrected joining pose of the suction head to an ambient temperature by taking into account a related thermal expansion of the cover lens, the housing and/or the suction head, wherein the housing includes the hollow screws, which each extend through the protruding lugs and which are oriented mutually perpendicular or parallel, wherein the bottom surface of each of the hollow screws defines a respective one of the reference points of the reference-point system, such that the measuring device measures the pose of the cover lens relative to the bottom surface of the each of the hollow screws.

* * * * *